(12) United States Patent
Malhotra et al.

(10) Patent No.: US 7,932,296 B2
(45) Date of Patent: Apr. 26, 2011

(54) CATALYTIC PARTIAL OXIDATION REFORMING FOR SYNGAS PROCESSING AND PRODUCTS MADE THEREFROM

(75) Inventors: Avinash Malhotra, Houston, TX (US); David P. Mann, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 350 days.

(21) Appl. No.: 12/175,749

(22) Filed: Jul. 18, 2008

(65) Prior Publication Data

US 2008/0275143 A1    Nov. 6, 2008

Related U.S. Application Data

(60) Continuation-in-part of application No. 11/526,152, filed on Sep. 22, 2006, now abandoned, which is a division of application No. 10/708,606, filed on Mar. 15, 2004, now Pat. No. 7,138,001.

(60) Provisional application No. 60/320,011, filed on Mar. 16, 2003.

(51) Int. Cl.
*C07C 27/00* (2006.01)

(52) U.S. Cl. ........ 518/700; 518/702; 518/703; 518/704; 518/705

(58) Field of Classification Search .................. 518/700, 518/702–705
See application file for complete search history.

(56) References Cited

U.S. PATENT DOCUMENTS

| | | | |
|---|---|---|---|
| 2,896,927 A | 7/1959 | Nagle et al. | |
| 3,920,717 A | 11/1975 | Marion | |
| 3,929,429 A | 12/1975 | Crouch | |
| 4,081,253 A | 3/1978 | Marion | |
| 5,011,625 A | 4/1991 | Le Blanc | |
| 5,122,299 A | 6/1992 | LeBlanc | |
| 5,358,696 A | 10/1994 | Jahnke | |
| 5,362,454 A | 11/1994 | Cizmer et al. | |
| 5,486,313 A | 1/1996 | De Jong et al. | |
| 5,496,859 A | 3/1996 | Fong et al. | |
| 5,720,901 A | 2/1998 | De Jong et al. | |
| 5,861,441 A * | 1/1999 | Waycuilis | 518/703 |
| 6,005,011 A | 12/1999 | Henningsen | |
| 6,726,850 B1 | 4/2004 | Reyes et al. | |
| 6,730,285 B2 | 5/2004 | Aasberg-Petersen et al. | |
| 6,894,080 B2 | 5/2005 | Seiki et al. | |

(Continued)

FOREIGN PATENT DOCUMENTS

DE    3521304    12/1986

(Continued)

*Primary Examiner* — Jafar Parsa
(74) *Attorney, Agent, or Firm* — KBR IP Legal Dept.

(57) ABSTRACT

Systems and methods for producing syngas are provided. A first hydrocarbon can be partially oxidized in the presence of an oxidant and one or more first catalysts at conditions sufficient to partially combust a portion of the first hydrocarbon to provide carbon dioxide, non-combusted first hydrocarbon, and heat. The non-combusted first hydrocarbon can be reformed in the presence of the heat generated in the partial oxidation step and the one or more first catalysts to provide a first syngas. Heat can be indirectly exchanged from the first syngas to a second hydrocarbon to reform at least a portion of the second hydrocarbon in the presence of steam and one or more second catalysts to provide a second syngas. A syngas, which can include the at least a portion of the first syngas, at least a portion of the second syngas, or a mixture thereof can be converted to provide one or more Fischer-Tropsch products, methanol, derivatives thereof, or combinations thereof.

19 Claims, 6 Drawing Sheets

U.S. PATENT DOCUMENTS

| | | |
|---|---|---|
| 6,958,363 B2 | 10/2005 | Espinoza et al. |
| 7,125,913 B2 | 10/2006 | Pan et al. |
| 7,138,001 B2 | 11/2006 | Knez et al. |
| 7,144,923 B2 | 12/2006 | Fitzpatrick |
| 7,226,548 B2 | 6/2007 | Xie et al. |
| 7,261,751 B2 | 8/2007 | Dutta et al. |
| 2002/0155061 A1* | 10/2002 | Prasad et al. .......... 423/652 |
| 2003/0162846 A1 | 8/2003 | Wang et al. |
| 2006/0128818 A1 | 6/2006 | Wang et al. |
| 2007/0004809 A1 | 1/2007 | Lattner et al. |
| 2007/0129450 A1 | 6/2007 | Barnicki et al. |
| 2007/0217989 A1 | 9/2007 | Malhotra et al. |
| 2008/0047197 A1 | 2/2008 | Knez |

FOREIGN PATENT DOCUMENTS

| | | |
|---|---|---|
| EP | 168892 | 1/1986 |
| EP | 1277698 | 1/2003 |
| GB | 944059 | 12/1963 |

* cited by examiner

CATALYTIC PARTIAL OXIDATION REFORMING FOR SYNGAS PROCESSING AND PRODUCTS MADE THEREFROM

CROSS REFERENCE TO RELATED APPLICATION

This application is a continuation-in-part of U.S. Ser. No. 11/526,152 filed on Sep. 22, 2006, which is a divisional of Ser. No. 10/708,606 filed on Mar. 15, 2004, and issued as U.S. Pat. No. 7,138,001, which claims the benefit of provisional application U.S. Ser. No. 60/320,011, filed on Mar. 16, 2003; all of which are hereby incorporated by reference.

BACKGROUND

1. Field

The present embodiments generally relate to systems and processes for producing synthesis gas and products made therefrom. More particularly, embodiments of the present invention relate to systems and processes for producing syngas and products made therefrom by partial oxidation techniques.

2. Description of the Related Art

Partial oxidation ("POX") systems typically convert preheated hydrocarbon gas and oxidant at very high temperatures, e.g. from about 1,000° C. (1,832° F.) to about 1,300° C. (2,372° F.), to a syngas containing hydrogen, carbon monoxide, carbon dioxide, and water. The hot syngas must then be quenched or cooled, typically to about 200-300° C. (392-572° F.) prior to further processing.

Typically, the syngas is used as a rather expensive heat transfer medium to generate steam. However, the steam production can be far in excess of process requirements and is therefore exported or simply wasted because there is no use for the steam. In other words, cooling the syngas means that much of the heat of reaction is lost or wasted.

Maximizing or increasing the hydrogen and carbon monoxide production in an existing plant is desirable. However, the POX reactor is frequently a capacity-limiting operation because POX reactors cannot be easily expanded to increase production. There is a need, therefore, for more energy efficient systems and processes for producing syngas.

BRIEF DESCRIPTION OF DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and processes for producing syngas and products therefrom are provided. In one or more embodiments, a first hydrocarbon can be partially oxidized in the presence of an oxidant at conditions sufficient to partially combust a portion of the first hydrocarbon to provide carbon dioxide, non-combusted hydrocarbon, and heat. In one or more embodiments, at least a portion of the non-combusted hydrocarbon can be reformed in the presence of at least a portion of the heat generated in the partial oxidation step and one or more first catalysts to provide a first syngas. In one or more embodiments, the first syngas can contain, but is not limited to, hydrogen, carbon monoxide, and carbon dioxide. In one or more embodiments, heat from the first syngas can be indirectly exchanged with a second hydrocarbon to reform at least a portion of the second hydrocarbon in the presence of steam and one or more second catalysts to provide a second syngas. In one or more embodiments, the second syngas can contain, but is not limited to, hydrogen, carbon monoxide, and carbon dioxide. In one or more embodiments, a syngas, which can include the at least a portion of the first syngas, at least a portion of the second syngas, or a mixture thereof can be converted to provide one or more Fischer-Tropsch products, methanol, derivatives thereof, or combinations thereof.

Figure 1:
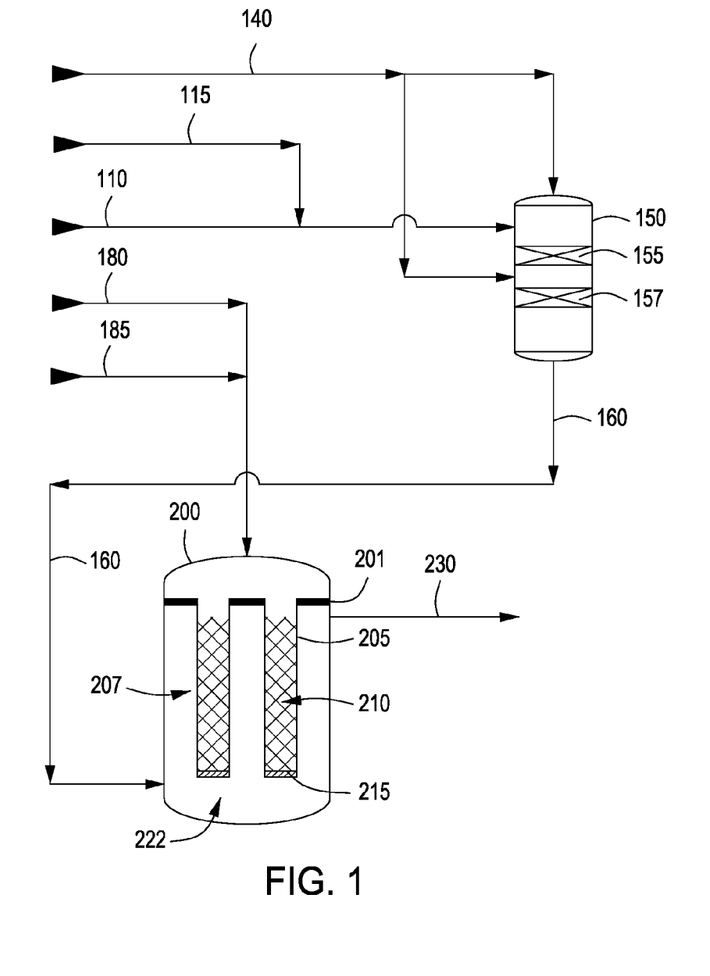
FIG. 1 depicts an illustrative system for producing syngas using partial oxidation techniques, according to one or more embodiments described.

With reference to the figures, FIG. 1 depicts an illustrative system for producing syngas using partial oxidation techniques, according to one or more embodiments. The system can include one or more catalytic partial oxidation ("CPOX") reactors 150 and one or more reforming exchangers 200. One or more first catalysts can be disposed within the CPOX reactor 150 in one or more first catalyst zones or catalyst beds 155, 157 (two are shown). The one or more first catalyst beds 155, 157 can be, but are not limited to, a fixed bed, fluidized bed, monolith type bed, or any combination thereof. The one or more catalyst beds 155, 157 can be supported by any known method, such as screens, support rods/bars, or other suitable support structures.

At least one of the reforming exchangers 200 can be a shell-and-tube type exchanger. The reforming exchanger 200 can include one or more tubes 205 at least partially disposed within the shell of the reforming exchanger 200. One or more second catalysts can be disposed within the one or more tubes 205 to provide one or more second catalyst zones 210 within the one or more tubes 205. The one or more second catalysts can be supported in the one or more tubes 205 by one or more screens 215 or other suitable support structures.

The one or more tubes 205 can be arranged in any pattern or configuration within the shell of the reforming exchanger 200. Although not shown, the tubes 205 can include, but are not limited to, one or more fins, static mixers, rifling, heat conductive packing, turbulence causing projections, or any combination thereof, disposed on the external surface and/or the internal surface of the tubes 205. The one or more tubes can be of various types, for example, straight tubes, bayonet tubes (not shown), U-tubes (not shown), coiled tubes (not shown), or any combination thereof. In one or more embodiments, two or more tubes 205 can be used which can have the same or different shape, length, and/or diameter or cross-sectional area. The one or more tubes 205 can be disposed in a vertical, horizontal, or any other angle within the reforming exchanger 200.

The tubes 205 can be supported within the shell of the reforming exchanger 200 by one or more tube sheets 201. The one or more tube sheets 201 can separate the shell-side of the reforming exchanger 200 from a first end of the one or more tubes 205 and can prevent fluid communication between the first end of the one or more tubes 205 and the shell-side of the reforming exchanger 200. A second end of the one or more tubes 205 can be in fluid communication with the shell-side of the reforming exchanger 200.

Figure 2:
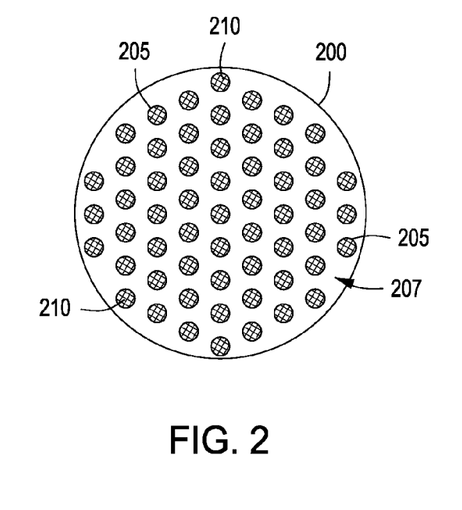
FIG. 2 depicts an illustrative cross-sectional top view of the reforming exchanger having a plurality of tubes, according to one or more embodiments described.

FIG. 2 depicts an illustrative cross-sectional top view of the reforming exchanger having a plurality of tubes, according to one or more embodiments. FIG. 2 depicts one or more second catalyst zones 210 disposed within a plurality of tubes 205. A plurality of tubes is defined as two or more tubes 205. A heating zone 207, defined by the space between or around the one or more tubes 205 (see also FIG. 1) allows heat to be indirectly transferred from a heat transfer medium introduced to the shell-side of the reforming exchanger 200 to the one or more catalyst zones 210.

Referring again to FIG. 1, the one or more first catalysts in the CPOX reactor 150 and/or the one or more second catalysts in the reforming exchanger 200 can include, but are not limited to, alkaline earth metals, rare earth metals, chromium, manganese, molybdenum, tungsten, tin, rhenium, bismuth, indium, phosphorus, iron, cobalt, nickel, ruthenium, rhodium, palladium, osmium, iridium, platinum, oxides thereof, derivatives thereof, mixtures thereof, or combinations thereof. The one or more second catalysts in the reforming exchanger 200 can be the same or different as the one or more first catalysts in the one or more CPOX reactors 150. The one or more first catalysts disposed in the CPOX reactor 150, the one or more second catalysts disposed in the reforming exchanger 200, or both can further include one or more catalyst support materials.

In one or more embodiments, the catalyst support materials can be or can include a refractory oxide. For example, the refractory oxide can be alumina, particularly alpha alumina; zirconia; titania; hafnia; silica; or mixtures thereof. The catalyst support material can be or can include rare earth modified refractory metal oxides, where the rare earth may be any rare earth metal, for example, lanthanum or yttrium; and/or alkali earth metal modified refractory oxides. The catalyst support material can be categorized as materials having a substantially stable surface area at reaction conditions, for example, a surface area that is not substantially altered by reaction conditions or altered in a way that affects the reaction.

The one or more first catalysts and/or second catalysts ("catalysts") can be in the form of granules, powder, beads, pills, pellets, flakes, cylinders, spheres, or other shapes. The catalysts can have a length or size ranging from 50 microns (0.002 in.) to about 1 cm (0.4 in.). In one or more embodiments, the catalysts can have a length or size ranging from about 0.25 mm (0.01 in.) to about 6.5 mm (0.26 in.) or from about 0.5 mm (0.02 in.) to about 0.4 mm (0.16 in.).

Additional reaction conditions, catalysts, and CPOX reactor 150 details can be found in U.S. Pat. Nos. 5,486,313; 5,720,901; 7,226,548; and 7,261,751 all of which are fully incorporated by reference herein. Additional reforming process conditions, catalysts, and reforming exchanger 200 details can be found in U.S. Pat. Nos. 5,011,625; 5,122,299; 5,362,454; 6,855,272; 7,138,001; and 7,220,505 all of which are fully incorporated by reference herein.

A first hydrocarbon via line 110 and an oxidant via line 140 can be introduced to the one or more CPOX reactors 150. The first hydrocarbon can be partially oxidized in the presence of the oxidant and the one or more first catalysts. The partial oxidation can occur at conditions sufficient to partially combust a portion of the first hydrocarbon to provide carbon dioxide, non-combusted hydrocarbon, and heat. The non-combusted hydrocarbon can be at least partially reformed, in the presence of at least a portion of the heat generated in the partial oxidation step and the one or more first catalysts, to provide a first syngas. The first syngas can include, but is not limited to, hydrogen, carbon monoxide, and carbon dioxide. As the partially combusted first hydrocarbon flows through/across the one or more first catalyst zones 155, 157, at least a portion of the non-combusted hydrocarbon can react (i.e. be reformed) to provide the first syngas. In one or more embodiments, the first hydrocarbon via line 110 can be mixed with steam and/or carbon dioxide via line 115 prior to introducing the first hydrocarbon to the one or more CPOX reactors 150. Although not shown, in one or more embodiments, the first hydrocarbon and the oxidant can be mixed upstream of the CPOX reactor 150 to provide a reactant mixture, which can then be introduced to the CPOX reactor 150. Although not shown, in one or more embodiments, steam and/or carbon dioxide via line 115 can be introduced directly to the one or more CPOX reactors 150 or premixed with the oxidant.

The one or more oxidants via line 140 can be introduced to the one or more CPOX reactors 150 before the first of the one or more first catalyst zones 155, 157. In one or more embodiments, a portion of the one or more oxidants via line 140 can be introduced, before each of the one or more first catalyst zones 155, 157, thereby providing inter-catalyst bed oxidant injection. Inter-catalyst bed oxidant injection can provide independent regulation and control of the amount of oxidant introduced via line 140 to each catalyst bed 155, 157. Controlling the amount of oxidant introduced via line 140 to the one or more catalyst beds 155, 157 can improve reaction rate and temperature regulation within the one or more first catalyst zones 155, 157.

The CPOX reactor 150 can be operated at a temperature of from about 700° C. (1,292° F.) to about 1,500° C. (2,732° F.) as measured by the temperature of the first syngas as the first syngas exits the CPOX reactor 150 via line 160. The CPOX reactor 150 can be operated at a temperature of from about 700° C. (1,292° F.), about 800° C. (1,472° F.), or about 900° C. (1,652° F.) to about 1,100° C. (2,012° F.), about 1,200° C. (2,192° F.), or about 1,300° C. (2,372° F.). The CPOX reactor 150 can be operated at a pressure of from about 100 kPa (0 psig) to about 15,000 kPa (2,162 psig), or from about 400 kPa (44 psig) to about 8,500 kPa (1,219 psig).

A second hydrocarbon via line 180 can be introduced to the one or more reforming exchangers 200. The second hydrocarbon can be mixed with steam via line 185. In one or more embodiments, the second hydrocarbon can be mixed with steam and carbon dioxide via line 185. The second hydrocarbon and steam mixture via line 180, with or without carbon dioxide, can be introduced to the one or more second catalyst zones 210. For example, the second hydrocarbon via line 180 can be introduced to the first end of the one or more second catalyst-containing tubes 205. The second hydrocarbon can be at least partially reformed by passing the second hydrocarbon through the one or more second catalyst zones 210 to provide a second syngas. The second syngas can include, but is not limited to, hydrogen, carbon monoxide, and carbon dioxide. The second syngas can exit the second end of the one or more tubes 205 through the screens 215 and can be mixed with the first syngas in mixing zone 222 to provide a mixed syngas or syngas product via line 230.

The first syngas via line 160 can be introduced to the shell-side of the reforming exchanger 200. The first syngas and second syngas can be mixed in a mixing zone 222 to provide a mixed syngas. The heat necessary for reforming the second hydrocarbon in the second catalyst zone 210 can be provided by the mixed syngas as the mixed syngas flows along/across the one or more tubes 205 through the heating zone 207. Although not shown the first syngas can pass across or around the outside of the one or more tubes 205 to indirectly transfer heat from the first syngas to the second catalyst zone 210 after which the first syngas and second syngas can be mixed in the mixing zone 222. The mixed syngas can be recovered as a syngas product ("syngas") via line 230.

The first hydrocarbon via line 110 and the second hydrocarbon via line 180 can include, but are not limited to, one or more carbon containing materials. The carbon containing materials can include, but are not limited to, methane, ethane, propane, butane, pentane, hexane, or any other hydrocarbon containing a total of one (1) to twenty (20) carbon atoms ($C_1$ to $C_{20}$), or any mixture thereof. The carbon containing materials can include, but are not limited to, $C_1$ to $C_5$ hydrocarbons or any mixture thereof. The carbon containing materials can include, but are not limited to, natural gas, methane, de-sulfurized natural gas, de-sulfurized methane, mixtures thereof, or any combination thereof. The first hydrocarbon and the second hydrocarbon can be the same or different carbon containing materials. The first hydrocarbon, the second hydrocarbon, or both can be substantially free of contaminants, such as sulfur, mercury, carbon monosulfide, and other contaminants.

The first hydrocarbon via line 110 and/or the second hydrocarbon via line 180 can contain about 80% mol dry basis methane or more, or about 90% mol dry basis methane or more, or about 95% mol dry basis methane or more, or about 97% mol dry basis methane or more, or about 99% mol dry basis methane or more. The term "dry basis," as used herein, refers to a feed, product, syngas, or intermediate without water and/or nitrogen.

The first hydrocarbon via line 110 can range from about 10% wt to 90% wt of the total combined first hydrocarbon and second hydrocarbon ("total feed"). The first hydrocarbon can range from about 20% wt to about 80% wt of the total feed or from about 30% wt to about 70% wt of the total feed, or from about 40% wt to about 60% wt of the total feed. The second hydrocarbon via line 180 can range from about 10% wt to about 90% wt of the total feed. The second hydrocarbon can range from about 20% wt to about 80% wt of the total feed, or from about 30% wt to about 70% wt of the total feed, or from about 40% wt to about 60% wt of the total feed.

The types and amounts of the one or more oxidants introduced via line 140 to the one or more CPOX reactors 150 can influence the composition and physical properties of the first syngas via line 160 and the syngas via line 230. The one or more oxidants can include but are not limited to, air, oxygen, essentially oxygen, oxygen-enriched air, mixtures of oxygen and air, water, carbon dioxide, mixtures of oxygen and inert gas such as nitrogen and argon, nitrogen-enriched air, and any mixture thereof. The oxidant can contain about 60% vol oxygen or more, or about 70% vol oxygen or more, or about 80% vol oxygen or more, or about 90% vol oxygen or more, or about 95% vol oxygen or more, or about 99% vol oxygen or more. As used herein, the term "essentially oxygen" refers to an oxidant containing more than 50% vol oxygen. As used herein, the term "oxygen-enriched air" refers to an oxidant stream containing more than 21% vol oxygen. Oxygen, essentially oxygen, or oxygen-enriched air can be obtained, for example, from cryogenic distillation, pressure swing adsorption, membrane separation, or any combination thereof. The one or more oxidants via line 140 can be nitrogen-free or essentially nitrogen-free. As used herein, the term "essentially nitrogen-free," refers to an oxidant stream containing about 5% vol nitrogen or less, 4% vol nitrogen or less, 3% vol nitrogen or less, 2% vol nitrogen or less, or 1% vol nitrogen or less.

The catalytic partial oxidation reaction that can occur in the CPOX reactor 150 can be promoted (i.e. controlled) by optimizing the concentrations of the one or more carbon containing materials and molecular oxygen ($O_2$) introduced via line 140. The first hydrocarbon and oxidant can be adjusted to have, for example, a molar carbon:$O_2$ ratio (C:$O_2$) in the range of from about 1:1 C:$O_2$ to about 10:1 C:$O_2$, or from about 1:1 C:$O_2$ to about 8:1 C:$O_2$, or from about 1:1 C:$O_2$ to about 6:1 C:$O_2$. The molar C:$O_2$ ratio can be in the range of from about 1.5:1 C:$O_2$ to about 4:1 C:$O_2$, or from about 1.6:1 C:$O_2$ to about 3.5:1 C:$O_2$, or from about 1.6:1 C:$O_2$ to about 2.5:1 C:$O_2$.

In one or more embodiments, steam and/or carbon dioxide can be present in the first hydrocarbon in line 110. Steam and/or carbon dioxide can be introduced directly to the CPOX reactor 150 and/or the first hydrocarbon in line 110. The weight ratio of steam to carbon of the first hydrocarbon via line 110 initially in contact with the first catalyst zone 155 can be from about 0 to about 3 and the weight ratio of carbon dioxide to carbon of the first hydrocarbon initially in contact with the first catalyst zone 155 can be from about 0 to about 2.

The one or more oxidants introduced via line 140 to the CPOX reactor 150 can be selected to provide the first syngas via line 160, the second syngas exiting the one or more tubes 205, and/or the syngas product via line 230 that can contain about 30% mol dry basis hydrogen or more, or about 40% mol dry basis hydrogen or more, or about 50% mol dry basis hydrogen or more, or about 60% mol dry basis hydrogen or more, or about 70% mol dry basis hydrogen or more. The oxidant via line 140 can be selected to provide the first syngas via line 160, the second syngas exiting the one or more tubes 205, and/or the syngas product via line 230 that can contain about 5% mol dry basis carbon monoxide or more, or about 10% mol dry basis carbon monoxide or more, or about 15% mol dry basis carbon monoxide or more, or about 20% mol dry basis carbon monoxide or more, or about 25% mol dry basis carbon monoxide or more, or about 30% mol dry basis carbon monoxide or more, or about 35% mol dry basis carbon monoxide or more. The oxidant via line 140 can be selected to provide the first syngas via line 160 and/or the syngas product via line 230 that can contain about 2% mol dry basis carbon dioxide or more, or 5% mol dry basis carbon dioxide or more, or about 10% mol dry basis carbon dioxide or more, or about 20% mol dry basis carbon dioxide or more.

The concentration of hydrogen in the first syngas via line 160, second syngas, and/or syngas product via line 230 can range from a low of about 30% mol dry basis, 40% mol dry basis, or 50% mol dry basis to a high of about 50% mol dry basis, 60% mol dry basis, or 70% mol dry basis. The hydrogen concentration in the first syngas via line 160, second syngas, and/or the syngas product via line 230 can range from a low of about 25% mol dry basis, 35% mol dry basis, or 45% mol dry basis to a high of about 55% mol dry basis, or 65% mol dry basis. The carbon monoxide concentration in the first syngas via line 160, second syngas, and/or the syngas product via line 230 can range from a low of about 5% mol dry basis, 10% mol dry basis, 15% mol dry basis, or 20% mol dry basis to a high of about 25% mol dry basis, 30% mol dry basis, or 35% mol dry basis. The carbon dioxide concentration in the first syngas via line 160, second syngas, and/or the syngas product via line 230 can range from a low of about 2% mol dry basis, 5% mol dry basis, or 7% mol dry basis, to a high of about 10% mol dry basis, 15% mol dry basis, or 25% mol dry basis.

The compositions of the first syngas via line 160, second syngas exiting the one or more tubes 205, and/or the second syngas product via line 230 can have different concentrations of hydrogen, carbon monoxide, and carbon dioxide. For example, the first syngas via line 160 can have a hydrogen concentration of about 60% mol dry basis and the syngas product via line 230 can have a hydrogen concentration of about 70% mol dry basis. The concentrations of hydrogen, carbon monoxide, and carbon dioxide in the first syngas via line 160 and the syngas product via line 230 can vary over time. Several factors can affect the concentrations of the first syngas via line 160 and the syngas product via line 230, which can include, but are not limited to flow rates, hydrocarbon feed composition, temperatures, pressures, catalyst type, catalyst age, and oxidant.

The composition of the syngas product via line 230 can be about 65% mol dry basis hydrogen, about 30% mol dry basis carbon monoxide, and about 4% mol dry basis carbon dioxide. The composition of the syngas product via line 230 can be about 65% mol dry basis hydrogen, about 15% mol dry basis carbon monoxide, and about 15% mol dry basis carbon dioxide.

Figure 3:
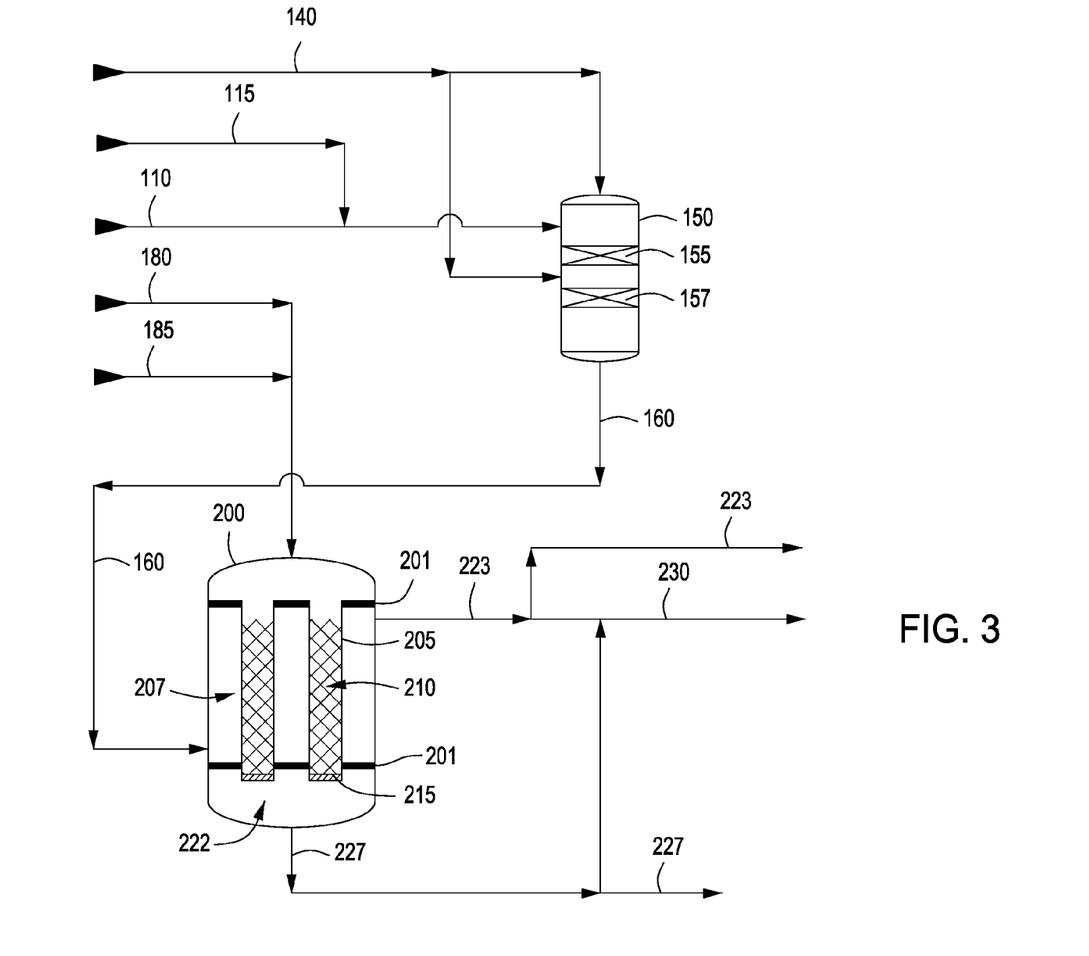
FIG. 3 depicts another illustrative system for producing syngas using partial oxidation techniques, according to one or more embodiments described.

FIG. 3 depicts another illustrative system for producing syngas using partial oxidation techniques, according to one or more embodiments. The one or more CPOX reactors 150, first hydrocarbon via line 110, oxidant via line 140, first syngas via line 160, second hydrocarbon via line 180, and syngas product via line 230 can be as discussed and described above with reference to FIG. 1. The one or more reforming exchangers 200 can be as discussed and described above with reference to FIG. 1, however, the internal configuration of the shell-and-tube type exchanger can be different. In one or more embodiments, the one or more catalyst-containing tubes 205 can have two or more tube sheets 201 (two are shown) disposed about the tubes 205. The one or more catalyst-containing tubes 205 can have at least one tube sheet disposed at or near the first end of the tubes 205 and at least one tube sheet disposed at or near the second end of the tubes 205 in such a manner that at least a portion of the second catalyst zone 210 can be positioned between the two tube sheets 201. In this embodiment, both ends of the catalyst-containing tubes 205 can be separated from (i.e. not in fluid communication with) the shell-side of the reforming exchanger 200.

The second hydrocarbon via line 180 can be introduced to the first end of the one or more tubes 205. The second hydrocarbon can be reformed in the second catalyst zone 210 within the one or more tubes 205. The tubes 205 can extend through the heating zone 207, which can be defined by the space or volume between the two or more tube sheets 201. The heat for the endothermic reforming reaction of the second hydrocarbon via line 180 can be provided by the heat from the first syngas introduced via line 160 to the heating zone 207. Rather than mixing the first syngas and the second syngas to provide a syngas product, as shown in FIG. 1, the first syngas can be recovered via line 223 and the second syngas can be recovered via line 227. In one or more embodiments, at least a portion of the first syngas via line 223 and at least a portion of the syngas via line 227 can be mixed to provide the syngas product via line 230. The first syngas via line 223, second syngas via line 227, or a mixture thereof (i.e. syngas product) via line 230 can contain, but are not limited to, hydrogen, carbon monoxide, and carbon dioxide.

Although not shown, in one or more embodiments, three or more tube sheets 201 can be installed to provide two or more heating zones 207 within the reforming exchanger 200. For example, three tube sheets 201 (two are shown) can be installed with the first tube sheet 201 disposed at or near a first end of the one or more tubes 205, the second tube sheet 201 disposed at or near the second end of the one or more tubes 205, and the third tube sheet (not shown) can be disposed between the first tube sheet 201 and second tube sheet 201 to provide two independent heating zones. In one or more embodiments, the first syngas via line 160 can be split and at least a portion of the first syngas via line 160 can be introduced to each independent heating zone. In one or more embodiments, the first syngas via line 160 can be introduced to one of the independent heating zones and a second heat transfer medium, such as steam, can be introduced to the other independent heating zone. This arrangement can improve temperature control within the multiple reaction zones as the amount of heat introduced to a particular heating zone from the first syngas via line 160 can be independently controlled by controlling the amount of the first syngas (or other heat transfer medium) introduced to the two or more heating zones.

Figure 4:
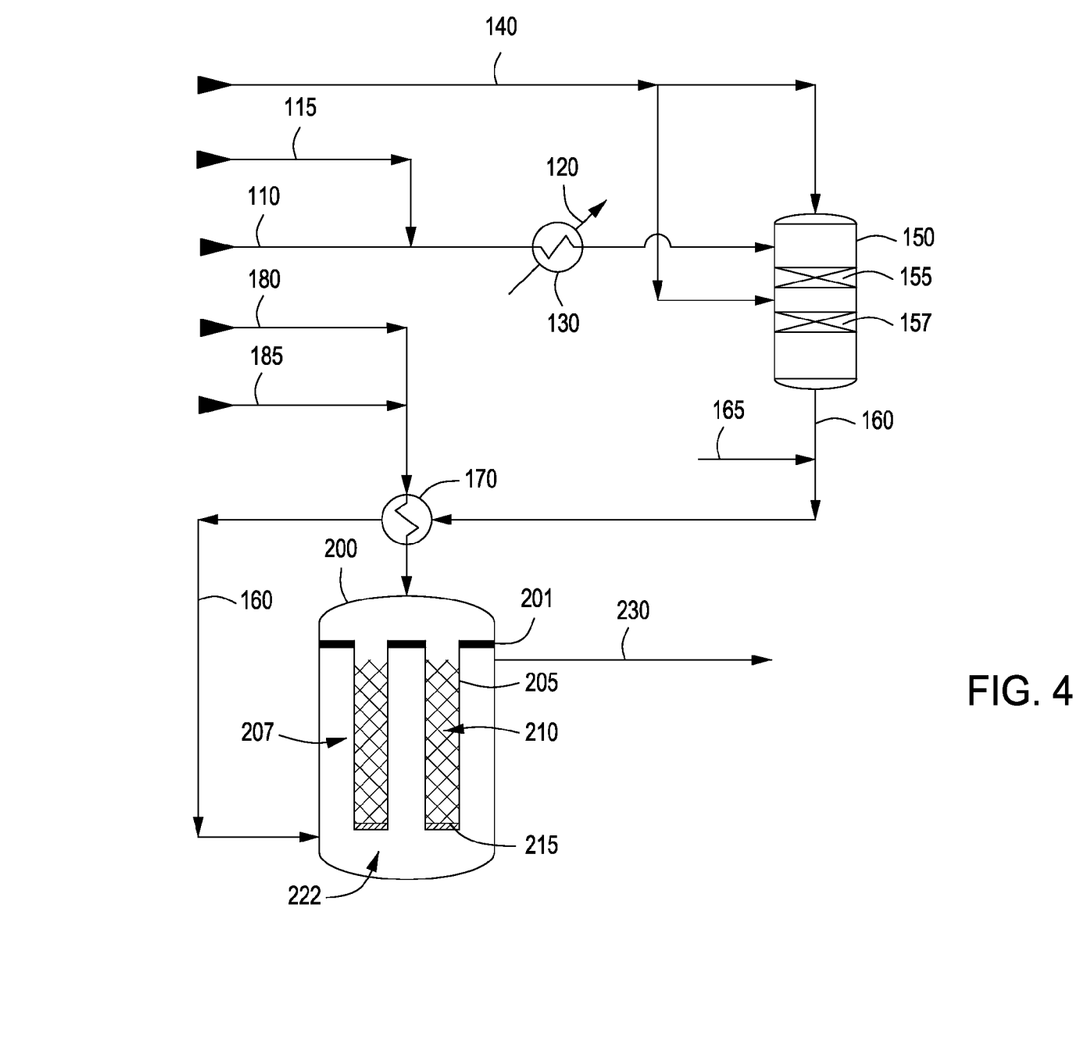
FIG. 4 depicts another illustrative system for producing syngas using partial oxidation techniques, according to one or more embodiments described.

FIG. 4 depicts another illustrative system for producing syngas using partial oxidation techniques, according to one or more embodiments. The one or more CPOX reactors 150, one or more reforming exchangers 200, first hydrocarbon via line 110, oxidant via line 140, first syngas via line 160, second hydrocarbon via line 180, second syngas, and syngas product via line 230 can be as discussed and described above with reference to FIGS. 1-3. In one or more embodiments, the system can further include one or more heat exchangers (two are shown 130, 170). The heat exchangers can be used to preheat the first hydrocarbon via line 110, second hydrocarbon via line 180 and/or to cool the first syngas via line 160.

The first hydrocarbon in line 110 can be preheated in one or more heat exchangers 130 by a heat transfer medium, such as steam, supplied via line 120. The first hydrocarbon in line 110 can be preheated to a temperature of from about 100° C. (212° F.) to about 900° C. (1,652° F.), or from about 100° C. (212° F.) to about 700° C. (1,292° F.), or from about 300° C. (572° F.) to about 500° C. (932° F.). For example, the first hydrocarbon in line 110 can be preheated to a temperature of about 400° C. (752° F.), about 500° C. (932° F.), or about 600° C. (1,112° F.).

The second hydrocarbon in line 180 can be preheated in one or more heat exchangers 170 using the first syngas in line 160 as a heat transfer medium. In one or more embodiments, the second hydrocarbon in line 180 can be preheated in heat exchanger 170 by transferring heat to the second hydrocarbon in line 180 from an externally supplied heat transfer medium, such as steam. The second hydrocarbon via line 180 can be preheated to a temperature of from about 100° C. (212° F.) to about 900° C. (1,652° F.), or from about 300° C. (212° F.) to about 700° C. (1,292° F.), or from about 450° C. (842° F.) to about 650° C. (1,202° F.). For example, the second hydrocarbon in line 180 can be preheated to a temperature of about 400° C. (752° F.), about 500° C. (932° F.), or about 600° C. (1,112° F.).

In one or more embodiments, the first syngas in line 160 can be cooled between the CPOX reactor 150 and the reforming exchanger 200. The first syngas in line 160 can be cooled by indirect cooling, direct cooling, or both. The first syngas in line 160 can be cooled, for example, by direct cooling with water, carbon dioxide, or any other suitable cooling medium introduced via line 165. The first syngas in line 160 can be cooled by non-contact cooling, for example, by indirectly transferring heat with a heat transfer medium in one or more heat exchangers, for example heat exchanger 170. Any suitable heat transfer mediums can be used in the heat exchanger 170, for example, the second hydrocarbon via line 180, water (not shown), another process feed from within the plant (not shown), mixtures thereof, or combinations thereof. The first syngas via line 160 can be cooled to temperature of from about 700° C. (1,292° F.) to about 1,100° C. (2,012° F.) or from about 750° C. (1,382° F.) to about 1,000° C. (1,832° F.).

The temperature of the first syngas introduced via line 160 to the reforming exchanger 200 can be about 10% to about 300% greater than the temperature of the second hydrocarbon introduced via line 180 to the reforming exchanger 200. The temperature of the first syngas introduced via line 160 to the reforming exchanger 200 can be about 30% greater, about 40% greater, about 50% greater, about 60% greater, or about 70% greater or more than the temperature of the second hydrocarbon introduced via line 180 to the reforming exchanger 200.

Although not shown, in one or more embodiments the oxidant introduced via line 140 to the CPOX reactor 150 can be preheated in one or more heat exchangers or mixed with the first hydrocarbon and heated in heat exchanger 130. The oxidant can be preheated to a temperature of from about 100° C. (212° F.) to about 900° C. (1,652° F.), or from about 100° C. (212° F.) to about 700° C. (1,292° F.), or from about 300° C. (572° F.) to about 500° C. (932° F.).

Figure 5:
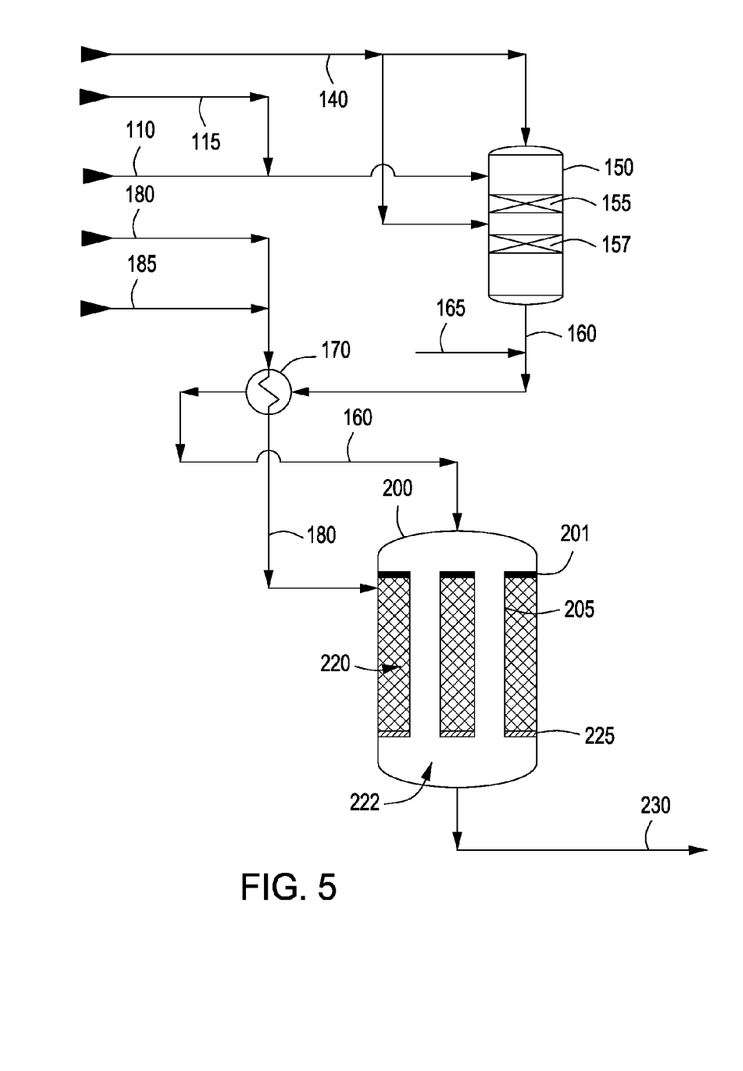
FIG. 5 depicts yet another illustrative system for producing syngas using partial oxidation techniques, according to one or more embodiments described.

FIG. 5 depicts yet another illustrative system for producing syngas using partial oxidation techniques, according to one or more embodiments. The one or more CPOX reactors 150, first hydrocarbon via line 110, oxidant via line 140, second hydrocarbon via line 180, first syngas via line 160, second syngas, and syngas product via line 230 can be as discussed and described above with reference to FIGS. 1-4. The one or more reforming exchangers 200 can be as discussed and described above with reference to FIG. 1, however, the internal configuration of the shell-and-tube type exchanger can be different. In one or more embodiments, the one or more second catalysts can be disposed within at least a portion of the shell-side of the reforming exchanger 200 to provide one or more second catalyst zones 220. The one or more second catalysts in the second catalyst zone 220 can be supported by a catalyst screen 225, or any other suitable support structure to provide a mixing zone 222 adjacent the second end of the one or more tubes 205. In one or more embodiments, the second catalyst can be placed within the shell-side of the reforming exchanger without a catalyst screen 225, wherein the mixing zone 222 can contain a portion of the second catalyst.

Figure 6:
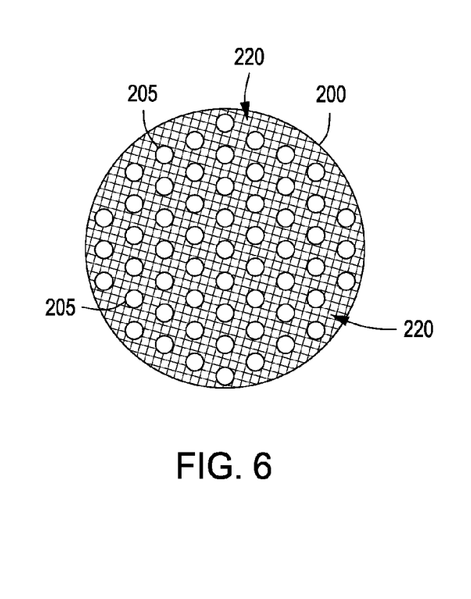
FIG. 6 depicts an illustrative cross-sectional top view of the reforming exchanger having a plurality of tubes, according to one or more embodiments described.

FIG. 6 depicts an illustrative cross-sectional top view of the reforming exchanger having a plurality of tubes, according to one or more embodiments described. FIG. 6 depicts the second catalyst zone 220 disposed within at least a portion of the shell-side of the reforming exchanger 200. The second catalyst zone 220 can be disposed about the one or more catalyst free tubes 205. Heat can be indirectly transferred from a heat transfer medium which can flow through the tubes 205 to the second catalyst zone 220.

Referring again to FIG. 5, the first syngas via line 160 can be introduced to the tube-side of the reforming exchanger 200. The first syngas via line 160 can flow through the one or more tubes 205. The second hydrocarbon can be introduced via line 180 to the shell-side of the reforming exchanger 200, which can flow through and/or across the second catalyst zone 220, wherein the second hydrocarbon can be reformed to provide the second syngas which can be introduced to the mixing zone 222 through catalyst screens 225. The heat necessary for reforming the second hydrocarbon can be indirectly transferred from the first syngas flowing through the one or more tubes 205 to the second catalyst zone 220.

Although not shown, in one or more embodiments, the first syngas and second syngas can be mixed outside the reforming exchanger 200 as discussed and described with reference to FIG. 3. In one or more embodiments, the first syngas and second syngas can be independently recovered (i.e. no mixing) from the reforming exchanger 200. For example, the catalyst screen 225 can be replaced by a second tube sheet 201, which can provide separate and independent flow paths for the first syngas and the second syngas. The second syngas can be recovered from an exit line in fluid communication with the shell-side of the reforming exchanger 200 and the first syngas can be recovered from an exit line in fluid communication with the tube side of the reforming exchanger.

Although not shown, in one or more embodiments, the first syngas introduced via line 160 can be apportioned differently to different areas throughout the catalyst zone. For example, two or more sets of independently supplied tubes disposed within and/or through the second catalyst zone 220 can be introduced with varying amounts of the first syngas via line 160. For example, 70% of the first syngas via line 160 can be introduced to a first set of tubes and 30% can be introduced to a second set of tubes, which can provide more heat in a first portion of the catalyst zone 220 wherein more unreacted second hydrocarbon via line 180 can be present. The two or more sets of independently supplied tubes disposed within and/or through the second catalyst zone 220 can be straight, U-form, spiral wound, and/or bayonet type tubes.

Although not shown, in one or more embodiments, the first syngas via line 160 can be introduced at either end of the one or more tubes 205 and/or anywhere along the length of the one or more tubes 205. For example, the first syngas via line 160 can be introduced directly to the mixing zone 222, and the mixed syngas can flow through the one or more tubes 205.

Figure 7:
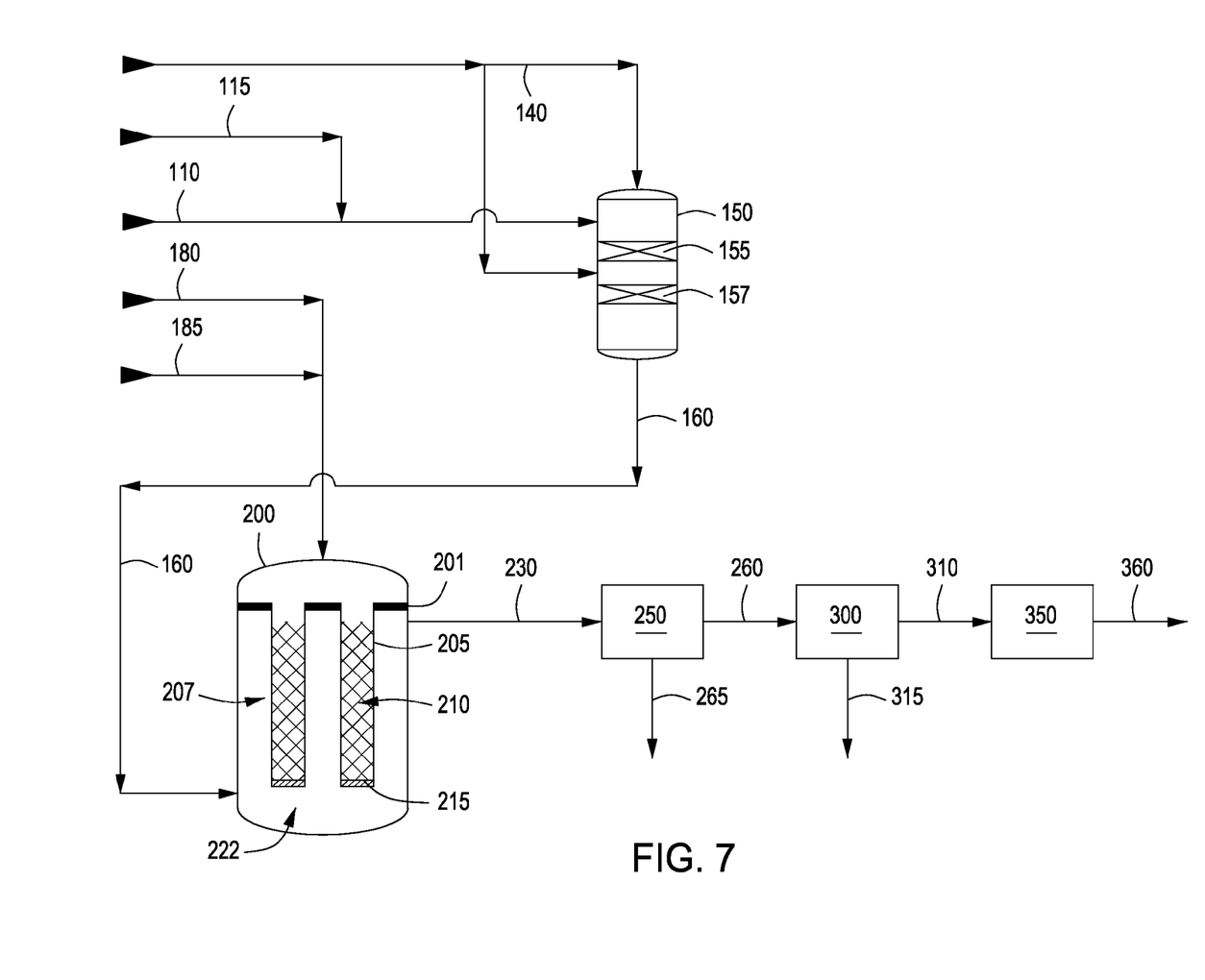
FIG. 7 depicts an illustrative system for producing syngas, hydrocarbon products, and derivatives thereof, according to one or more embodiments described.

FIG. 7 depicts an illustrative system for producing syngas, hydrocarbon products, and derivatives thereof, according to one or more embodiments. The syngas via line 230 can be produced using the system discussed and described above with reference to FIGS. 1-6. The system can further include one or more carbon dioxide removal units 250, one or more driers 300, and one or more hydrocarbon synthesis systems 350. The oxidant introduced via line 140 to the CPOX reactor 150 can be a high oxygen containing gas such as oxygen, essentially-oxygen, oxygen-enriched air, nitrogen-free oxidant, or essentially nitrogen-free oxidant, which can provide a syngas in line 230 with a high hydrogen and carbon monoxide composition.

The one or more carbon dioxide removal systems 250 can include, but are not limited to, one or more physical separation systems, such as membrane type separation systems. The carbon dioxide removal systems can include, but are not limited to, chemical separation systems, such as absorbtion/adsorption type, solvent-based, systems. The carbon dioxide removal system 250 can contact the syngas introduced via line 230 with one or more absorbents or adsorbents to remove at least a portion of the carbon dioxide. The carbon dioxide removal system can include, but is not limited to, monoethanolamine (MEA), diethanolamine ("DEA"), triethanolamie ("TEA"), potassium carbonate, methyldiethanolamine ("MDEA"), diglycolamine ("DGA"), diisopropanolamine ("DIPA"), alkyl carbonates such as propylene carbonate, dimethyl ethers of polyethylene glycol of two to twelve glycol units (Selexol™ process), n-methyl-pyrrolidone, sulfolane, and use of the Sulfinol® Gas Treatment Process, derivatives thereof, mixtures thereof, or any combination thereof.

At least a portion of the syngas via line 230 (or lines 227, 223, and/or 230, see FIG. 3) can be introduced to the one or more carbon dioxide removal systems 250 to provide carbon dioxide via line 265 and a gas mixture via line 260 which can contain hydrogen, carbon monoxide, and water. The gas mixture via line 260 can contain less than about 3% mol dry basis carbon dioxide, less than about 2% mol dry basis carbon dioxide, less than about 1% mol dry basis carbon dioxide, less than about 0.5% mol dry basis carbon dioxide, less than about 0.1% mol dry basis carbon dioxide, or less than about 0.01% mol dry basis carbon dioxide. The carbon dioxide via line 265 can be vented to the atmosphere, used for enhanced oil recovery, injected into a terrestrial formation or marine environment for disposal, and/or as a refrigerant.

At least a portion of the gas mixture via line 260 can be introduced to the one or more driers 300 to remove at least a portion of water from the gas mixture in line 260 to provide a dried gas mixture via line 310 and water via line 315. The one or more driers 300 can include, but are not limited to, one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The dried gas mixture via line 310 can contain about 97% mol dry basis hydrogen and carbon monoxide or more, or about 98% mol dry basis hydrogen and carbon monoxide or more, or about 99% mol dry basis hydrogen and carbon monoxide or more, or about 99.5% mol dry basis hydrogen and carbon monoxide or more. The hydrogen content of the dried gas mixture in line 310 can range from a low of about 40% mol, or about 45% mol, to a high of about 60% mol, about 65% mol, or about 70% mol. The carbon monoxide content of the dried gas mixture in line 310 can range from a low of about 10% mol, about 15% mol, or about 20% mol to a high of about 30% mol, about 45% mol, or about 60% mol.

At least a portion of the dried gas mixture via line 310 can be introduced to the one or more hydrocarbon synthesis units 350, which can provide various hydrocarbon products via line 360, waste water (not shown), and a tail gas (not shown). Although not shown, at least a portion of the gas mixture via line 260 and/or at least a portion of the syngas via line 230 can be introduced to the one or more hydrocarbon synthesis units 350. The hydrocarbon synthesis unit 350 can be any device or process suitable for converting the dried gas mixture in line 310 and/or the gas mixture in line 260 and/or the syngas in line 230 into hydrocarbon products. The types of products that can be provided by the one or more hydrocarbon synthesis units 350 can include, but are not limited to, one or more Fischer-Tropsch products and hydroformylation products.

The hydrocarbon synthesis unit 350 can include any type of suitable reactor bed, such as a fixed bed, fluidized bed, or entrained flow bed. The hydrocarbon synthesis unit can be operated at a temperature of from about 40° C. (104° F.) to about 400° C. (752° F.) or higher and pressures of from about 100 kPa (0 psig) to about 10,500 kPa (1,509 psig), which can depend on the particular type of hydrocarbon synthesis unit 350 and hydrocarbon products being produced. The hydrocarbon synthesis reaction can be strongly exothermic, therefore a heat removal system (not shown) can also be included. Steam produced from the recovered heat can be used to drive machinery and/or to produce electric power and/or be used as process steam.

In one or more embodiments, the hydrocarbon synthesis unit 350 can be a Fischer-Tropsch synthesis unit, which can react hydrogen and carbon monoxide in the presence of one or more catalysts to provide the one or more Fischer-Tropsch products via line 360. Illustrative Fischer-Tropsch catalysts can include, but are not limited to, cobalt, iron, palladium, rhodium, ruthenium, zinc, derivatives thereof, mixtures thereof, or combinations thereof.

The Fischer-Tropsch products via line 360 can be a mixture of hydrocarbons having a wide range of molecular weights, spanning from light gaseous hydrocarbons ($C_1$-$C_4$), naphtha ($C_5$-$C_{10}$), diesel ($C_{11}$-$C_{20}$), and wax (>$C_{20}$), derivatives thereof, or combinations thereof. The majority of the hydrocarbons via line 360 can be normal ("linear") paraffins. The Fischer-Tropsch products can include, but are not limited to, diesel fuels, kerosene, aviation fuels, propane, butane, LPG, lubricants, naphtha, gasoline, detergents, waxes, lubricants, refinery/petrochemical feedstocks, other transportation fuels, synthetic crude oil, liquid fuels, alpha olefins, derivatives thereof, mixtures thereof, or combinations thereof.

In one or more embodiments, the hydrocarbon synthesis unit 350 can be or include a hydroformylation synthesis unit, which can add a formyl group (—CHO) and a hydrogen atom to a carbon-carbon double bond to provide one or more aldehydes. The hydroformylation synthesis unit can include one or more hydroformylation catalysts such as the transition metal catalysts, such as cobalt carbonyl or rhodium complexes (e.g. rhodium triarylphosphine).

While not shown, in one or more embodiments, one or more alkenes can be introduced to the syngas in line 230, the gas mixture in line 260, or the dried gas mixture in line 310 to provide a hydrocarbon feed gas, which can include, but is not limited to, hydrogen, carbon monoxide, and one or more alkenes. The dried gas mixture and the one or more alkenes can react to provide one or more aldehydes. Although not shown, at least a portion of the dried gas mixture via line 310 can be introduced to a Fischer-Tropsch synthesis unit to provide one or more olefins (e.g. alkenes) via line 360. The one or more olefins provided via line 360 can then be introduced along with at least a portion of the dried gas mixture via line 310 to a hydroformylation synthesis unit to provide the one or more aldehydes. The one or more aldehydes can be further processed (not shown) into alcohols or oxidized to carboxylic acids.

In one or more embodiments, it can be desirable to control the hydrogen-to-carbon monoxide molar ratio ($H_2$:CO) in the syngas introduced to the hydrocarbon synthesis system 350. For example a ratio of 2:1 $H_2$:CO can be desirable for many Fischer-Tropsch hydrocarbon products. Adjustments can be made to the operating conditions in CPOX reactor 150 and/or the reforming exchanger 200. Although not shown, additional hydrogen or carbon monoxide can be added upstream of the hydrocarbon synthesis unit 350 to maintain a pre-determined hydrogen-to-carbon monoxide ratio in the dried gas mixture introduced via line 310 to the hydrocarbon synthesis unit 350. The nature of the adjustments will depend on the design of the overall system and the composition of the first hydrocarbon via line 115 and the second hydrocarbon via line 180.

The process scheme for further treatment of the water (not shown) can vary as water treatment is site-specific. Although not shown, the tail gas from the hydrocarbon synthesis unit 350 (e.g. a Fischer-Tropsch synthesis unit) can contain, but is not limited to, hydrogen, carbon monoxide, carbon dioxide, methane, and/or water. Although not shown, at least a portion of the tail gas from the Fischer-Tropsch system 350 can be recycled to the first hydrocarbon in line 115, the second hydrocarbon in line 150, or both. Although not shown, at least a portion of the tail gas from the hydrocarbon synthesis unit can be introduced to a methanator to provide synthetic natural gas.

Figure 8:
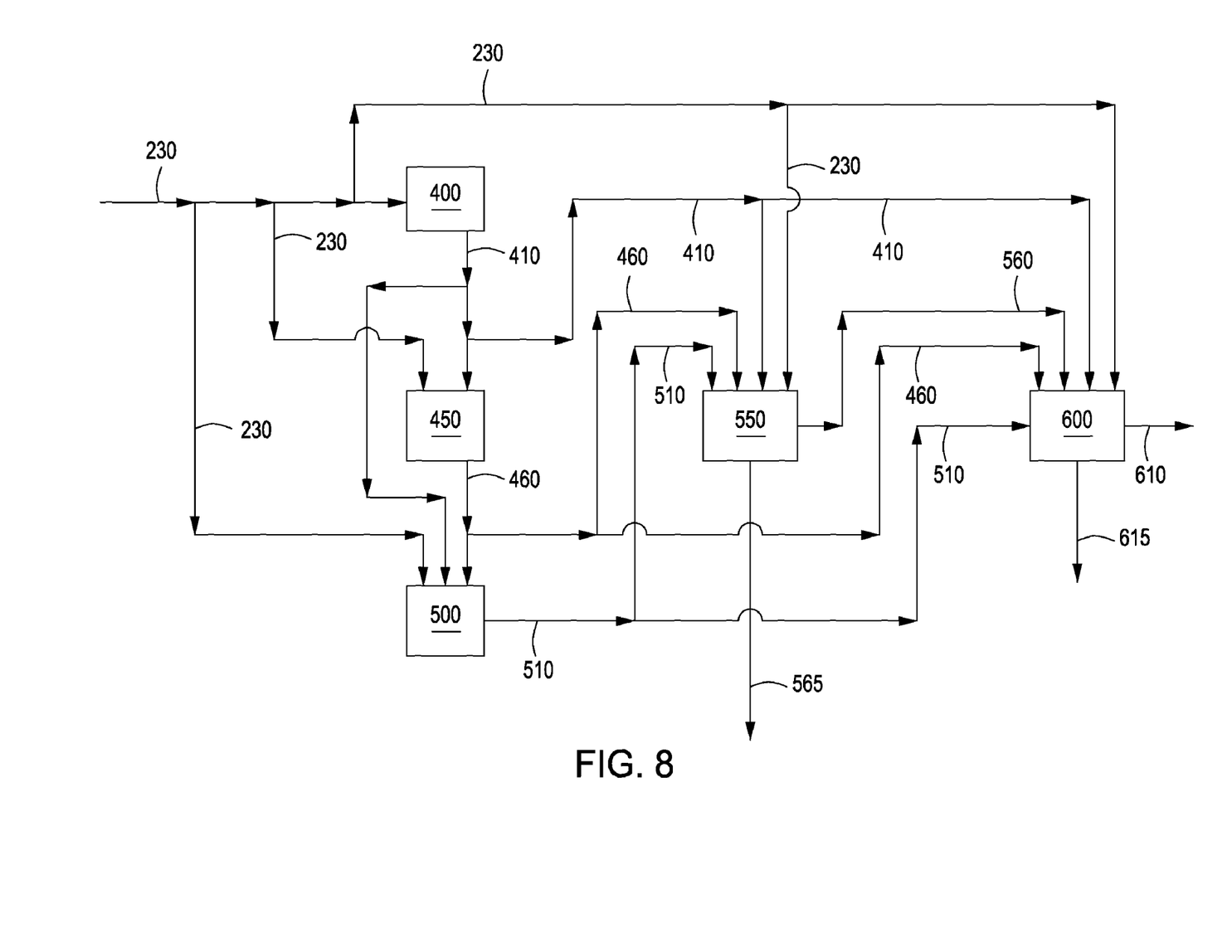
FIG. 8 depicts an illustrative system for producing syngas, methanol, and derivatives thereof, according to one or more embodiments described.

FIG. 8 depicts an illustrative system for producing syngas, methanol, and derivatives thereof, according to one or more embodiments. The syngas via line 230 can be produced using the system discussed and described above with reference to FIGS. 1-6. At least a portion of the syngas in line 230 can be introduced to one or more high temperature shift converters ("HTSC") 400, medium temperature shift converters ("MTSC") 450, low temperature shift converters ("LTSC") 500, carbon dioxide removal systems 550, hydrocarbon synthesis units 600, or any combination thereof. The sequence and amount of syngas introduced via line 230 to any particular unit can be determined by the ratio of hydrogen, carbon monoxide, and carbon dioxide present in the syngas and the ratio desired for converting the syngas to methanol and other products.

The HTSC 400, MTSC 450, and LTSC 500 can convert carbon monoxide in the syngas in line 230 to carbon dioxide by reacting the carbon monoxide in the presence of a catalyst at a temperature sufficient to oxidize the carbon monoxide. The catalyst disposed in the HTSC 400 can include, but is not limited to, iron oxide, zinc ferrite, magnetite, chromium oxides, derivatives thereof, or any combination thereof. The HTSC 400 can be operated at a temperature of from about 325° C. (617° F.) to about 550° C. (1,022° F.). The catalyst disposed in the MTSC 450 can include, but is not limited to, iron oxide, chromium oxide, derivatives thereof, or any combination thereof. The MTSC 450 can be operated at a temperature of from about 250° C. (482° F.) to about 300° C. (572° F.). The catalyst disposed in the LTSC 500 can include, but is not limited to, copper, zinc, copper promoted chromia, derivatives thereof, or any combination thereof. The LTSC 500 can be operated at a temperature from about 180° C. (356° F.) to about 220° C. (428° F.).

The one or more carbon dioxide removal systems 550 can remove at least a portion of the carbon dioxide present in the syngas introduced via lines 230, 410, 460, and/or 510. The carbon dioxide removal system can include physical separation systems including, but not limited to, membrane type separation systems. The carbon dioxide removal system can include chemical separation systems including, but not limited to, absorption/adsorption type, solvent-based, systems. The carbon dioxide removal system can contact the syngas introduced via line 230 with one or more absorbents or adsorbents to remove at least a portion of the carbon dioxide. The carbon dioxide removal system can use, but is not limited to, MEA, DEA, TEA, potassium carbonate, MDEA, DGA, DIPA, alkyl carbonates such as propylene carbonate, dimethyl ethers of polyethylene glycol of two to twelve glycol units (Selexol™ process), n-methyl-pyrrolidone, sulfolane, and use of the Sulfinol® Gas Treatment Process, derivatives thereof, mixtures thereof, or any combination thereof.

The methanol synthesis unit 600 can include, but is not limited to, one or more catalysts, which can convert at least a portion of the syngas introduced via line 230 to methanol. The one or more catalysts can include copper, zinc, aluminum, chromium, titanium, zirconium, magnesium, derivatives thereof, or combinations thereof. The one or more catalysts can be disposed in one or more catalysts beds (not shown). The one or more catalyst beds can be fixed or fluidized. The methanol synthesis unit 600 can be operated at a temperature of from about 160° C. (320° F.) to about 300° C. (572° F.). The hydrocarbon synthesis unit 600 can be operated at a pressure of from about 3,000 kPa (421 psig) to about 15,000 kPa (2,162 psig).

The syngas via line 230, intermediates via line 410, 460, and/or 510, can be apportioned equally or unequally to any one or more of the following: HTSCs 400, MTSCs 450, LTSCs 500, carbon dioxide removal systems 550, and/or methanol synthesis units 600. In one or more embodiments, at least a portion of the syngas can be introduced via line 230 to one or more HTSCs 400 to provide an intermediate via line 410. In one or more embodiments, at least a portion of the intermediate via line 410 can be introduced to one or more MTSCs 450, LTSCs 500, separation systems 550, or any combination thereof.

In one or more embodiments, at least a portion of the syngas can be introduced via line 230 to one or more MTSCs 450 to provide an intermediate via line 460. In one or more embodiments, at least a portion of the intermediate via line 460 can be introduced to one or more HTSCs 400, LTSCs 500, separation systems 550, or any combination thereof.

In one or more embodiments, at least a portion of the syngas via line 230 can be introduced to one or more LTSCs 500 to provide an intermediate via line 510. In one or more embodiments, at least a portion of the intermediate via line 510 can be introduced to one or more HTSCs 400, MTSCs 450, separation systems 550, or any combination thereof.

Although not shown, in one or more embodiments, the methanol provided via line 610 can be further processed to provide additional products. The additional products can include, but are not limited to, dimethyl ether ("DME"), formalin, acetic acid, formaldehyde, methyl-tertiary butyl ether, methylamines, methyl methacrylate, dimethyl terephthalate, methyl mercaptan, methyl chloride methyl acetate, acetic anhydride, ethylene, propylene, polyolefins, derivatives thereof, mixtures thereof, or combinations thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing syngas and one or more hydrocarbon products therefrom, comprising:
    partially oxidizing a first hydrocarbon in the presence of an oxidant and one or more first catalysts at conditions sufficient to partially combust a portion of the first hydrocarbon to provide carbon dioxide, non-combusted first hydrocarbon, and heat;
    reforming at least a portion of the non-combusted first hydrocarbon in the presence of at least a portion of the heat generated in the partial oxidation step and the one or more first catalysts in a catalytic partial oxidation (CPOX) reactor to provide a first syngas comprising hydrogen, carbon monoxide, and carbon dioxide;
    indirectly exchanging heat from the first syngas to a second hydrocarbon to reform at least a portion of the second hydrocarbon in the presence of steam and one or more second catalysts to provide a second syngas comprising hydrogen, carbon monoxide, carbon dioxide, and water; and
    reacting the first syngas, the second syngas, or a mixture thereof to provide a tail gas and one or more Fischer-Tropsch products, derivatives thereof, or combinations thereof,
    wherein the composition of the first syngas upon exiting the CPOX reactor comprises from about 30% mol dry basis to about 70% mol dry basis hydrogen, from about 5% mol dry basis to about 35% mol dry basis carbon monoxide, and from about 5% mol dry basis to about 25% mol dry basis carbon dioxide.

2. The process of claim 1, further comprising removing at least a portion of the carbon dioxide from the syngas before reacting the syngas to provide the tail gas and the one or more Fischer-Tropsch products, derivatives thereof, or combinations thereof.

3. The process of claim 1, further comprising removing at least a portion of the carbon dioxide and at least a portion of the water from the syngas before reacting the syngas to provide the tail gas and the one or more Fischer-Tropsch products, derivatives thereof, or combinations thereof.

4. The process of claim 1, further comprising at least one of preheating the first hydrocarbon to a temperature of at least 400° C. prior to partial oxidation and preheating the second hydrocarbon to a temperature of at least 400° C. prior to reformation.

5. The process of claim 1, further comprising cooling the first syngas by direct heat exchange, indirect heat exchange, or both with a heat transfer medium before indirectly exchanging heat from the first syngas to the second hydrocarbon.

6. The process of claim 1, wherein the one or more first catalysts, second catalysts, or both comprise a mixture of two or more catalysts.

7. The process of claim 1, wherein the first hydrocarbon and the second hydrocarbon are independently one or more $C_1$—$C_{20}$ hydrocarbons.

8. The process of claim 1, wherein the first hydrocarbon and the second hydrocarbon are independently natural gas, de-sulfurized natural gas, methane, de-sulfurized methane, or a mixture thereof.

9. The process of claim 1, wherein the first hydrocarbon and the second hydrocarbon are supplied in a weight ratio of from about 20:80 to about 80:20.

10. The process of claim 1, wherein at least a portion of the tail gas is introduced to a methanator to provide a synthetic natural gas.

11. A process for producing syngas >and hydrocarbon products comprising:
- partially oxidizing a first hydrocarbon in the presence of an oxidant and one or more first catalysts at conditions sufficient to partially combust a portion of the first hydrocarbon to provide carbon dioxide, non-combusted first hydrocarbon, and heat;
- reforming at least a portion of the non-combusted first hydrocarbon in the presence of at least a portion of the heat generated in the partial oxidation step and the one or more first catalysts in a catalytic partial oxidation (CPOX) reactor to provide a first syngas comprising hydrogen, carbon monoxide, and carbon dioxide;
- indirectly exchanging heat from the first syngas to a second hydrocarbon to reform at least a portion of the second hydrocarbon in the presence of steam and one or more second catalysts to provide a second syngas comprising hydrogen, carbon monoxide, carbon dioxide, and water; and
- converting at least a portion of the first syngas, at least a portion of the second syngas, or a mixture thereof to methanol, derivatives thereof, or combinations thereof,
- wherein the composition of the first syngas upon exiting the CPOX reactor comprises from, about 30% mol dry basis to about 70% mol dry basis hydrogen, from about 5% mol dry basis to about 35% mol dry basis carbon monoxide, and from about 5% mol dry basis to about 25% mol dry basis carbon dioxide.

12. The process of claim 11, further comprising converting at least a portion of the carbon monoxide in the syngas to carbon dioxide before converting at least a portion of the syngas to methanol, derivatives thereof, or combinations thereof.

13. The process of claim 11, further comprising removing at least a portion of the carbon dioxide in the syngas before converting at least a portion of the syngas to methanol, derivatives thereof, or combinations thereof.

14. The process of claim 11, further comprising converting at least a portion of the carbon monoxide in the syngas to carbon dioxide and removing at least a portion of the carbon dioxide from the syngas before converting the syngas to methanol, derivatives thereof, or combinations thereof.

15. The process of claim 11, further comprising cooling the first syngas by direct heat exchange, indirect heat exchange, or both with a heat transfer medium before indirectly exchanging heat from the first syngas to the second hydrocarbon in the presence of steam and the one or more second catalysts.

16. The process of claim 11, wherein the oxidant, comprises oxygen, essentially-oxygen, oxygen-enriched air, nitrogen-free air, essentially nitrogen-free air, or a mixture thereof.

17. The process of claim 11, wherein the second reaction zone comprises one or more tubes, each containing the second catalyst.

18. The process of claim 11, wherein the first hydrocarbon and the second hydrocarbon are independently one or more $C_1$—$C_{20}$ hydrocarbons.

19. The process of claim 11, wherein the first hydrocarbon and the second hydrocarbon are independently natural gas, de-sulfurized natural gas, methane, de-sulfurized methane, or a mixture thereof.

* * * * *